(12) United States Patent
Lesecq

(10) Patent No.: US 7,553,116 B2
(45) Date of Patent: Jun. 30, 2009

(54) FASTENER ADAPTED TO BE FIXED IN A CAVITY OF PREDETERMINED CONTOUR

(75) Inventor: Jean-Pierre Lesecq, Cormeilles en Parisis (FR)

(73) Assignee: ITW de France, Beauchamp (FR)

( * ) Notice: Subject to any disclaimer, the term of this patent is extended or adjusted under 35 U.S.C. 154(b) by 468 days.

(21) Appl. No.: 11/356,193

(22) Filed: Feb. 17, 2006

(65) Prior Publication Data
US 2006/0198714 A1    Sep. 7, 2006

(30) Foreign Application Priority Data
Mar. 2, 2005    (FR) ................................ 05 02109

(51) Int. Cl.
*F16B 13/04* (2006.01)
*F16B 19/00* (2006.01)
(52) U.S. Cl. .................... 411/45; 411/508; 411/913; 411/41
(58) Field of Classification Search ............ 411/41, 411/45–48, 508, 913, 349
See application file for complete search history.

(56) References Cited

U.S. PATENT DOCUMENTS

| | | | |
|---|---|---|---|
| 2,745,620 A | | 5/1956 | Murphy |
| 5,163,795 A | * | 11/1992 | Benoit et al. .................. 411/45 |
| 5,586,364 A | * | 12/1996 | Ferrari et al. .................. 16/383 |
| 5,718,549 A | * | 2/1998 | Noda et al. .................. 411/553 |
| 5,775,860 A | * | 7/1998 | Meyer .......................... 411/46 |
| 6,045,309 A | * | 4/2000 | LeVey .......................... 411/45 |
| 6,196,756 B1 | * | 3/2001 | Leverger ..................... 403/326 |
| 6,322,305 B1 | * | 11/2001 | Bantle .......................... 411/41 |
| 6,769,849 B2 | * | 8/2004 | Yoneoka ....................... 411/45 |
| 6,827,536 B1 | * | 12/2004 | Leon et al. .................... 411/61 |
| 6,955,515 B2 | * | 10/2005 | Barina et al. ................ 411/508 |
| 7,105,119 B2 | * | 9/2006 | Kanie et al. .................. 264/238 |
| 7,207,758 B2 | * | 4/2007 | Leon et al. .................... 411/45 |
| 7,249,922 B2 | * | 7/2007 | Yoneoka ....................... 411/45 |
| 2004/0175250 A1 | | 9/2004 | Yoneoka |

FOREIGN PATENT DOCUMENTS

| | | |
|---|---|---|
| FR | 2 761 127 A | 9/1998 |
| GB | 2 057 554 A | 4/1981 |
| JP | 2002 106531 A | 4/2002 |

* cited by examiner

*Primary Examiner*—Victor Batson
*Assistant Examiner*—David C Reese
(74) *Attorney, Agent, or Firm*—Lowe Hauptman Ham & Berner LLP

(57) ABSTRACT

The fastener comprises a first part having a stem and a head attached to one end of the stem, and a second part having two elastic feet and a plate from which the elastic feet project transversely, the stem being adapted to slide in an opening formed in the plate, the fastener being adapted to assume a waiting position in which the first part is held in the second part by means of the stem passing through the opening and clamping said plate between a stop surface and a tooth; a locking position; and an unlocking position.

13 Claims, 4 Drawing Sheets

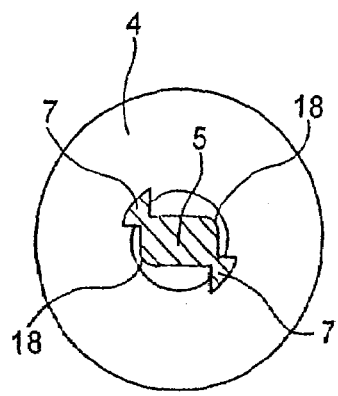
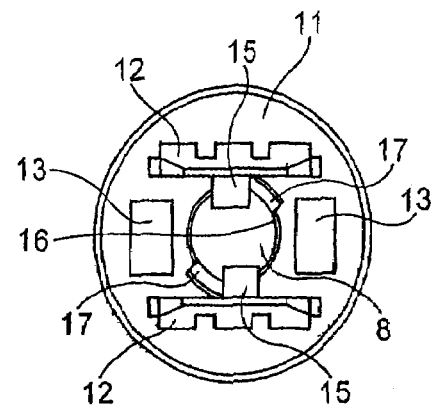
Fig.4     Fig.5
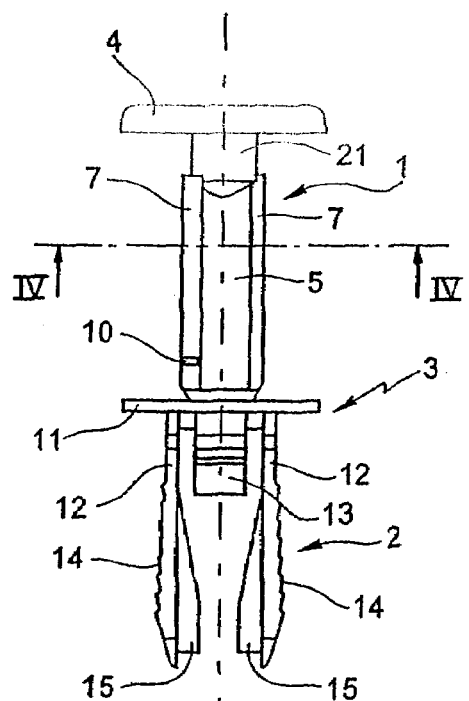
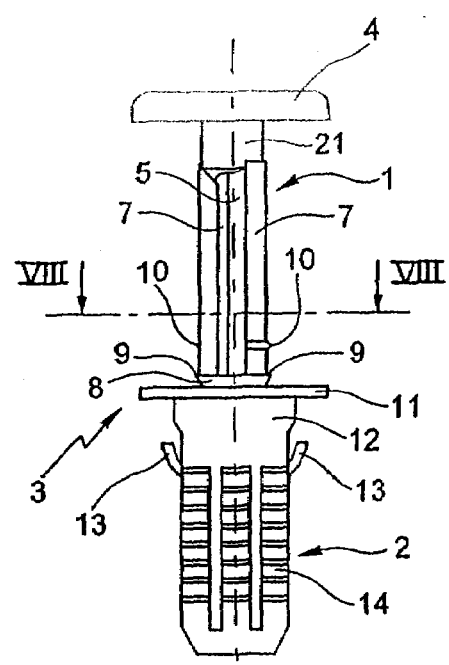
Fig.6     Fig.7
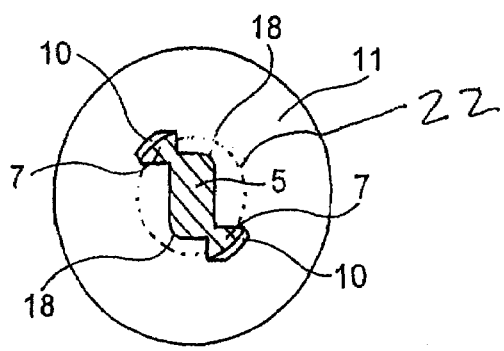
Fig.8

FASTENER ADAPTED TO BE FIXED IN A CAVITY OF PREDETERMINED CONTOUR

RELATED APPLICATIONS

The present application is based on, and claims priority from, French Application Number 0502109, filed Mar. 2, 2005, the disclosure of which is hereby incorporated by reference herein in its entirety.

FIELD OF THE INVENTION

The invention relates to fasteners provided with elastic feet adapted to be urged apart.

It concerns more particularly such fasteners adapted to be fixed in a cavity of predetermined contour.

These fasteners make it possible, for example, to fix an article onto a support provided with such a cavity of predetermined contour.

BACKGROUND OF THE INVENTION

An article for blind fixing is known from FR 2 761 127 comprising a first part provided with two flexible feet which in the absence of urging assume a resting position in which they can be introduced into an opening in a support and a second part comprising a fixing leg adapted to cooperate with the first part such that the fixing leg can be introduced through the first part to attain a locking configuration in which the support or fixing leg urges apart the flexible feet of the first part against the walls of the opening in the support.

This article may thus be locked onto the support by pushing the fixing leg, along its longitudinal axis, into the first part by virtue of the specific shape of the fixing leg which, during the course of being pushed into the first part, urges the elastic feet apart.

This article may furthermore be unlocked by rotating the second part through a quarter turn. The specific form of the fixing leg, with an H-section, leads to stoppage of the urging apart of the elastic feet once the rotation through a quarter turn has been performed.

Once the article has been unlocked, it can no longer be relocked by a quarter turn and must be extracted from the support. It may nevertheless be locked on the support again if, once the article has been extracted from the support, the elastic feet are separated manually to free the fixing foot and to put the article into the initial configuration again for a new locking operation by pushing the fixing leg into the first part.

So-called "quarter turn" fasteners are also known, in particular in the automotive field, comprising a first part provided with elastic feet that are adapted to be inserted into a cavity of predetermined contour, as well as a second part comprising a head and a stem of rectangular cross-section, the first part and the second part being associated in such a manner that the stem is disposed parallel to and between the two elastic feet.

Such a fastener is adapted to assume an unlocking position in which the stem is angularly oriented so as not to urge the elastic feet apart; and a locking position obtained after a rotation through a quarter turn with respect to the unlocking position, in which the stem is angularly oriented so as to urge the elastic feet apart.

This fastener is thus lockable and unlockable by simply rotating its head.

SUMMARY OF THE INVENTION

The object of the invention is to improve this type of fastener.

To that end, the invention is directed to a fastener adapted to be fixed in a cavity of predetermined contour, said fastener comprising a first part having a stem and a head attached to an end of the stem, and a second part having two elastic feet and a plate from which the elastic feet project transversely, the stem being adapted to slide in an opening formed in the plate, said fastener being characterized in that the first part comprises a stop surface projecting transversely of the stem at the end thereof remote from the head;

in that a longitudinal rib is attached along the stem and comprises a tooth in the vicinity of said stop surface;

and in that an aperture is formed in said plate, on the edges of said opening, said aperture being adapted to guide the longitudinal sliding of said rib in order to angularly orient the first part with respect to the second part such that, on sliding of the stem in said opening, the stem urges the elastic feet apart; by virtue of which said fastener is adapted to assume:

a waiting position in which the first part is held in the second part by means of the stem passing through the opening and clamping said plate between said stop surface and said tooth;

a locking position in which the first part and the second part fit one into the other such that the stem faces the elastic feet and is free to rotate with respect to the plate, the second part being clamped between the head and the stop surface of the first part, such that the elastic feet are urged apart by the stem;

an unlocking position in which the first part and the second part fit one into the other such that the stem faces the elastic feet and is free to rotate with respect to the plate, the second part being clamped between the head and the stop surface of the first part, such that the elastic feet are free with respect to the stem;

the fastener being adapted to pass from the waiting position to the locking position simply by pushing in of the stem, and to pass from the locking position to the unlocking position and vice-versa simply by rotation of the stem.

Such a fastener first of all enables an assembly to be made, starting from its waiting position, by pressing on the head of the first part, that is to say by pushing the stem into the second part. Such an assembly is rapid and simple since a single pushing action suffices to lock the fastener, as well as, where there is one, a part that it prevents from moving, within the cavity Such an assembly is particularly advantageous when rapid, effortless and secure assembly is necessary. This is the case for example on an automotive assembly line.

Such assembly by pushing also makes possible effective and secure blind assembly.

Once that first assembly by pushing has been achieved, the fastener is locked into its cavity and can be unlocked by rotation of the head of the first part.

This unlocking is reversible since the fastener can then be locked and unlocked at will by rotating the head in the appropriate direction.

Once the first assembly by pressing has been achieved, the fastener thus has all the advantages of a conventional "quarter-turn" fastener.

For better guiding of the stem, the fastener may comprise two longitudinal ribs each comprising a tooth, as well as two corresponding apertures.

According to a preferred feature, said rib has a substantially triangular cross-section, said rib being attached along the stem at a point of said substantially triangular cross-section.

Moreover, the stem may have a substantially rectangular cross-section to allow the locking and unlocking positions.

This rectangular cross-section of the stem may have two rounded corners, these corners being diagonally opposite. These rounded corners facilitate the passages between the locking and unlocking positions.

According to another preferred feature, the longitudinal rib is attached along the stem at a corner of the rectangular cross-section of the stem in order to form an abutment for stopping the rotation of the stem at the time of the passages between the locking and unlocking positions.

The stop surface may furthermore be formed by a stop disc projecting transversely of the stem and disposed at the end thereof remote from the head.

To enable the elastic feet to be urged apart, the elastic feet each comprise a locking ramp, said locking ramps being adapted to cooperate with the stem during passage to the locking position.

These locking ramps may be disposed face to face and laterally offset with respect to each other to facilitate the passages between the locking and unlocking positions.

According to a preferred feature, the plate comprises a circular shoulder adapted to cooperate with the stop surface when the fastener is in waiting position.

The stem may comprise a circular cross-section in the vicinity of its attachment to the head such that the passage from the locking position to the unlocking position is reversible.

According to a preferred feature, the elastic feet each comprise a shoulder adapted to cooperate with the stop surface such that the passage from waiting position to the locking position is irreversible.

The fastener may further be adapted to assume a molding position in which the first part and the second part are attached by a frangible zone, said stem of the first part being disposed facing the opening of the second part.

BRIEF DESCRIPTION OF THE DRAWING

Other features and advantages of the invention appear in the light of the following description of a preferred embodiment, given by way of non-limiting example, and made with reference to the accompanying drawings in which:

FIG. 4 is a view on section line IV-IV of FIG. 6;

FIG. 5 is a view from below of the fastener of FIG. 7;

FIGS. 6 and 7 are respectively views from the front and left of the fastener of FIG. 3;

FIG. 8 is a view on section line VIII-VIII of FIG. 7;

DETAILED DESCRIPTION OF THE DRAWING

Figure 1:
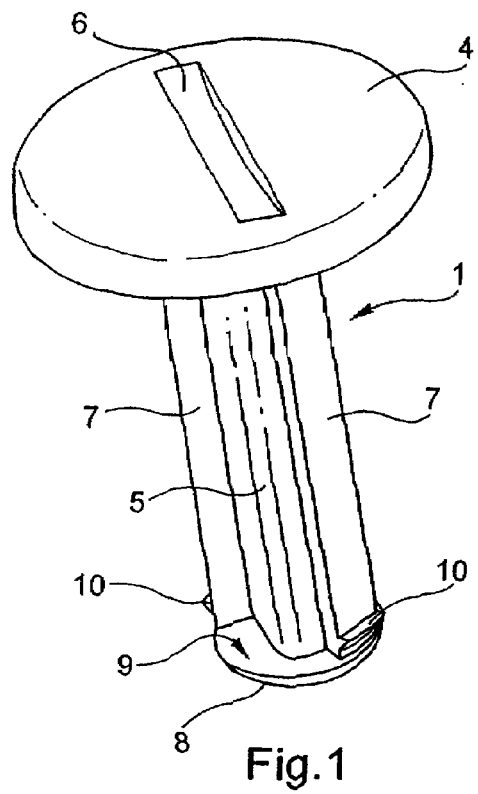
FIG. 1 is a perspective view of the first part of a fastener according to the invention.
Figure 3:
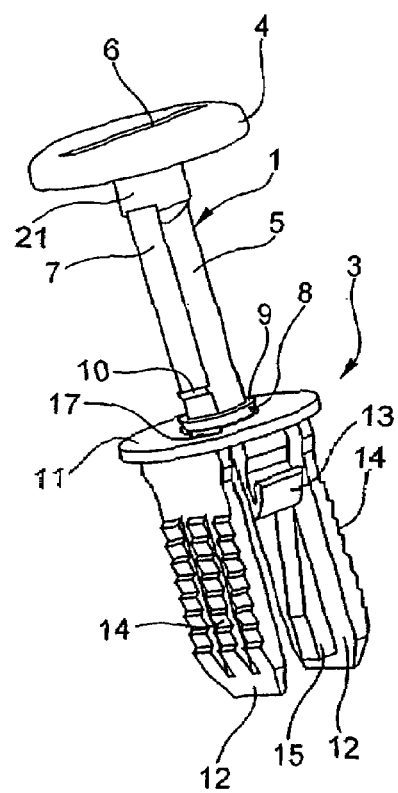
FIG. 3 is a representation in perspective of the fastener constituted by the first part of FIG. 1 and the second part of FIG. 2.
Figure 2:
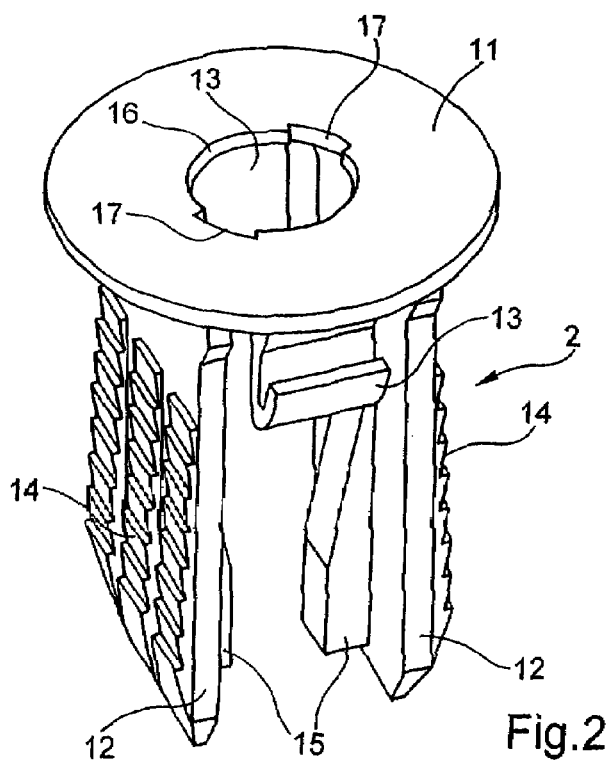
FIG. 2 is a perspective view of the second part of a fastener according to the invention.

FIGS. 1 and 2 respectively represent the first part 1 and the second part 2 in perspective which, when they are assembled, as represented in FIG. 3, form a fastener 3 according to the invention.

The first part 1 comprises a head 4 from which a stem 5 projects transversely.

Head 4 of the first part 1 has the form of a disk in which a slot 6 is formed adapted to receive the tip of a screwdriver or a coin to rotate the first part 1.

Stem 5 has the form of a substantially rectangular profiled section to which are jointed two longitudinal ribs 7 projecting from the stem 5 at two diagonally opposite corners of the rectangular cross-section of the stem 5.

At its end remote from head 4, stem 5 also comprises a stop disc 8 having a stop surface 9 extending parallel to and facing head 4.

Ribs 7 each comprise, in the vicinity of the stop disc 8, a notch 10 projecting inwardly and extending over the whole of the width of the corresponding rib 7.

The second part 2 represented in FIG. 2 itself comprises a plate 11 formed from a disk of material from which two elastic feet 12 project transversely.

Two hooking feet 13 also project from plate 11, between the elastic feet 12.

The elastic feet 12 are each covered, on their outwardly directed walls, with a retaining dentation 14, whereas on their inwardly directed faces, i.e. the faces of the elastic feet 12 which are directed towards each other, each elastic foot 12 comprises a locking ramp 15.

Plate 11 is pierced by a substantially circular opening 16 which issues between the elastic feet 12 and the hooking feet 13. Opening 16 is furthermore extended by two apertures 17 arranged diametrically opposite on the edges of opening 16. The cross-section of each of the apertures 17 substantially corresponds to the cross-section of a rib 7 of the first part 1.

The first part 1 and the second part 2 which have just been represented may be assembled so as to form the fastener 3 visible in FIG. 3. This fastener 3 may be obtained by molding the first part 1 and the second part 2 from the same polymer and by molding them in the same mold in order to directly obtain the assembly of FIG. 3. This assembly is a fastener 3 in molding position, i.e. the first part 1 is joined to the second part 2. More particularly, the first part 1 is connected to the second part 2 by a frangible zone 22 forming a link between the stop disc 8 of the first part 1 and the edges of opening 16 of the second part 2.

This fastener 3 in molding position is also represented in the various views of FIGS. 4 to 10.

FIGS. 6 and 7 are respectively views from the front and left of fastener 3.

The section view of FIG. 4 shows the shape of the cross-section of the stem 5 of FIG. 6. The rectangle forming the cross-section of stem 5 comprises two diametrically opposite rounded corners 18 whereas the other two diametrically opposite corners are each connected to a rib 7 of which the cross-section is substantially triangular.

The section view of FIG. 8 also shows the shape of the cross-section of the stem 5 as well as the teeth 10 which project from the ribs 7.

As regards FIG. 5, this is a direct view from below of the fastener 3 in the position of FIG. 7. This FIG. 5 makes it possible to see the arrangement of the elastic feet 12 and the hooking feet 13 on the plate 11 as well as the arrangement of the apertures 17 on the edges of the opening 16.

FIG. 5 also shows that the locking ramps 15 face each other while being offset laterally with respect to each other.

Figure 9:
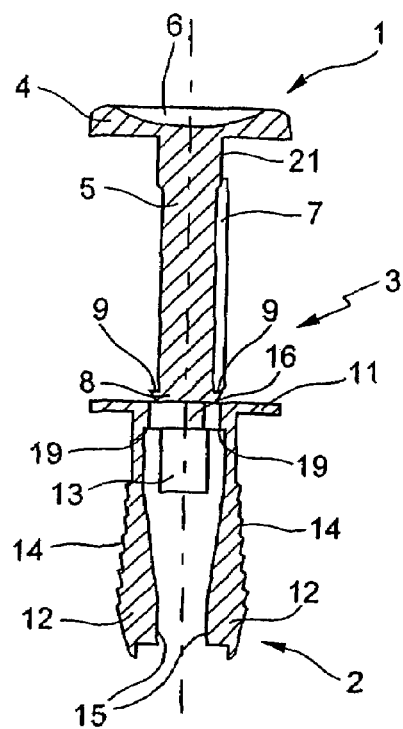
FIG. 9 is a longitudinal cross-section view of the fastener in the position of FIG. 6.
Figure 10:
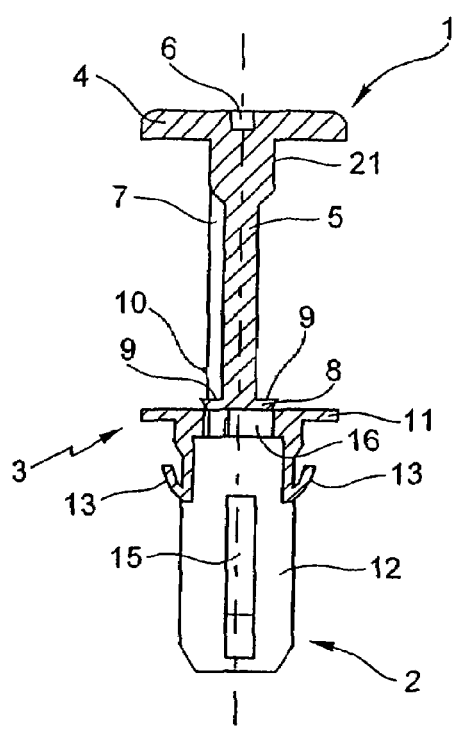
FIG. 10 is a longitudinal cross-section view of the fastener in the position of FIG. 7.

FIGS. 9 and 10 show fastener 3 in the respective positions of FIGS. 6 and 7, fastener 3 being viewed in longitudinal cross-section.

Once fastener 3 has been produced in its molding position of FIGS. 9 and 10, it may be put into waiting position in order to be delivered.

Figure 11:
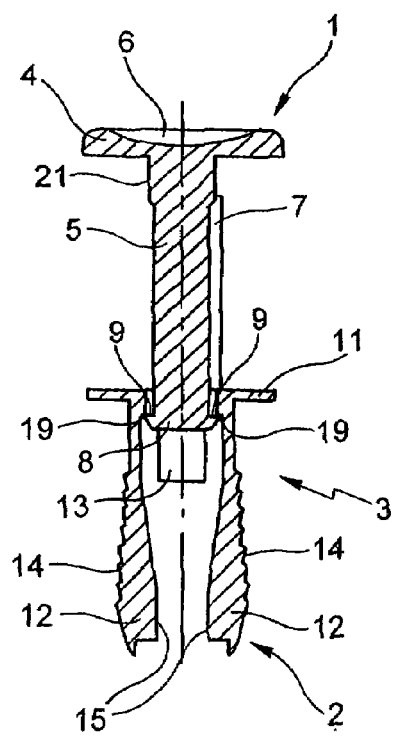
FIG. 11 is a view of the fastener similar to FIG. 9, the fastener here being in waiting position.
Figure 12:
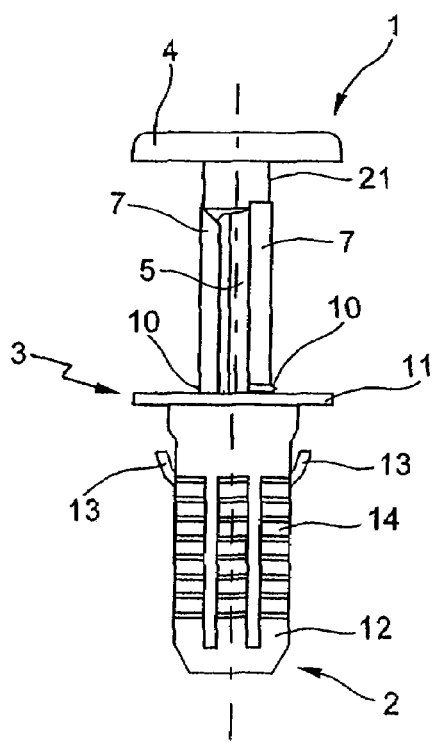
FIG. 12 is a front view of the fastener of FIG. 11, in waiting position, and viewed from the left.

FIGS. 11 and 12 show fastener 3, which here is in waiting position, from same views as FIGS. 9 and 10. Fastener 3 passes from its molding position of FIGS. 3 to 10 to this waiting position by the exertion of a push on the head 4 of the first part 1 such that the frangible zone 22 connecting the stop disc 8 to the plate 11 is ruptured and stem 5 passes through the opening 16 in the plate 11 until it reaches the equilibrium position of FIGS. 11 and 12 in which stem 5 of the first part 1 clamps the second part 1 between the stop surface 9 of the first part 1 and the teeth 10 of the ribs 7 of the first part 1.

This equilibrium position is enabled by virtue of a circular shoulder 19 made at the junction of the plate 11 and the elastic feet 12. This shoulder 19 is adapted to receive the stop surface 9 of the stop disc 8 after its forced passage through opening 16.

In this connection it is appropriate to use a material for producing the first part 1 and the second part 2 which has sufficient elasticity to enable this forced passage as well as the flexing of the elastic feet 12.

In this waiting position of FIGS. 11 and 12, fastener 3 may advantageously be delivered ready to use. It may also be delivered mounted directly on a member to be fixed by virtue of the hooking feet 13. The thickness of the member to be fixed is then held between the hooking feet 13 and the plate 11 (see FIG. 12).

The use of fastener 3 in waiting position delivered in this way is carried out in the following manner.

During the first use of fastener 3, the user inserts fastener 3, whether or not provided with a member to be fixed, in an opening which is here preferably of square cross-section and of a length corresponding substantially to the separation of the elastic feet 12. The user next pushes on head 4 of the first part 1 so as to make the whole of stem 5 pass through opening 16 until the locking position of FIG. 13 is reached.

In this position, the elastic feet 12 are urged apart by the cooperation of stem 5 and the elastic feet 12, stem 5 being angularly oriented to present the length of its rectangular cross-section between the elastic feet 12.

Figure 13:
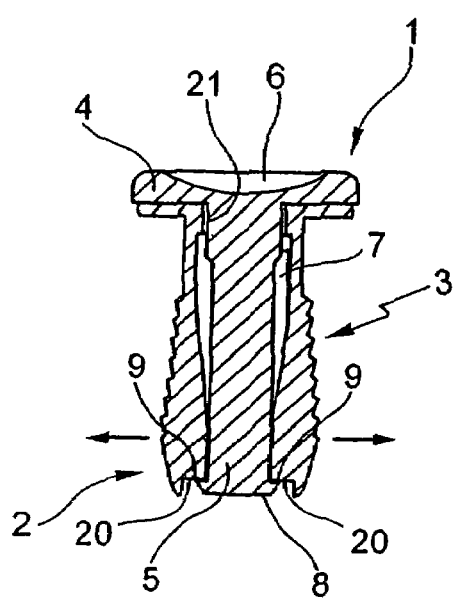
FIG. 13 is a view similar to FIGS. 9 and 11, the fastener here being in locking position.

Thus, in the direction of the arrows of FIG. 13, the elastic feet 12 push on the walls of the cavity in which fastener 3 has been arranged and so lock fastener 3 in its cavity by virtue of the retaining dentation 14. This locking was performed by a simple push on head 4 of the first part 1, the urging of the elastic feet 12 having been carried out by virtue of the locking ramps 15 progressively with the pushing in of stem 5 between the elastic feet 12.

The locking position of FIG. 13 is reached when the stop surface 9 of the stop disc 8 comes to rest on two shoulders 20, each formed at the end of an elastic foot 12, remote from its attachment to the plate 11.

The passage from the waiting position of FIGS. 11 and 12 to the locking position of FIG. 13 is irreversible, unless a manual action on the elastic feet 12 is carried out.

Nevertheless, fastener 3 may subsequently be extracted from the cavity in which it has been mounted by performing a rotation through a quarter turn of first part 1 by acting on head 4.

Stem 5 then presents the width of its rectangular cross-section between the elastic feet 12 which are no longer urged apart on account of this, so enabling fastener 3 to be extracted from its cavity.

Figure 14:
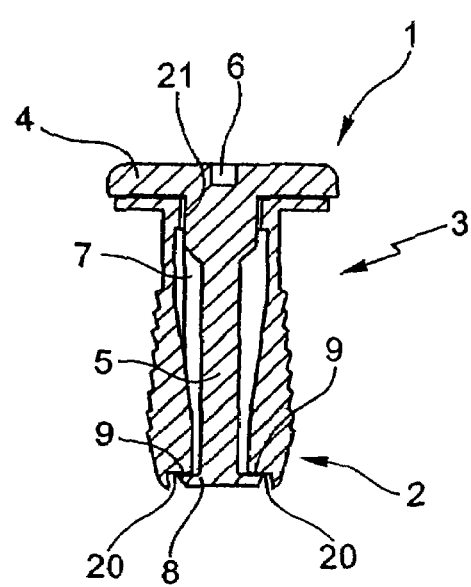
FIG. 14 is a view of the fastener of FIG. 13, the fastener here being in unlocking position.

Fastener 3 thus remains usable as a conventional "quarter-turn" fastener since the passage from the locking position of FIG. 13 to the unlocking position of FIG. 14 is reversible.

In these locking (FIG. 13) and unlocking (FIG. 14) positions, the opening 16 cooperates with a circular cross-section 21 of stem 5 disposed in the vicinity of head 4. This circular cross-section 21 enables free rotation of the first part 1 with respect to the second part 2.

The ribs 7 which, during the first usage, enabled the translational movement stem 5 with respect to the second part 2 to be guided, now form abutments for stopping rotation which limit the rotation of the first part 1 at the two extreme positions of FIGS. 13 and 14.

Variant embodiments of the fastener 3 may be envisaged without however departing from the scope of the invention. In particular, the number and the shape of the ribs 7 may vary provided these ribs enable the guiding and annular positioning of the first part 1 with respect to the second part 2.

The invention claimed is:

1. Fastener adapted to be fixed in a cavity of predetermined contour, said fastener comprising:
   a first part having a stem and a head attached to an end of the stem; and
   a second part having two elastic feet and a plate from which the elastic feet project transversely, the stem being adapted to slide in an opening formed in the plate;
   wherein the first part further comprises a stop surface projecting transversely of the stem at the end thereof remote from the head and a longitudinal rib is attached along the stem and includes a tooth proximate to the stop surface;
   wherein at least one aperture is formed on edges of said opening in said plate, said at least one aperture configured to angularly orient the first part with respect to the second part, whereby the stem urges the elastic feet apart;
   the fastener further comprising:
   a waiting position in which said plate is clamped between said stop surface and said tooth, thereby holding the first part in the second part;
   a locking position in which the first part and the second part fit one into the other, the stem facing the elastic feet and is rotateable with respect to the plate, the second part being clamped between the head and the stop surface of the first part, wherein the elastic feet are urged apart by the stem;
   an unlocking position in which the first part and the second part fit one into the other, the stem facing the elastic feet and rotateable with respect to the plate, the second part being clamped between the head and the stop surface of the first part, wherein the elastic feet are free with respect to the stem;
   the fastener being configured to pass from the waiting position to the locking position by pushing in of the stem, and to pass from the locking position to the unlocking position and vice-versa simply by rotation of the stem;
   wherein the plate comprises a circular shoulder adapted to cooperate with the stop surface when the fastener is in waiting position.

2. Fastener according to claim 1, wherein the first part comprises two longitudinal ribs, each comprising a tooth, and the second part comprises two apertures.

3. Fastener according to claim 1, wherein said rib has a substantially triangular cross-section, said rib being attached along the stem at a point of said substantially triangular cross-section.

4. Fastener according to claim 1, wherein the stem has a substantially rectangular cross-section.

5. Fastener according to claim 4, wherein the rectangular cross-section of the stem has two rounded corners, said corners being diagonally opposite.

6. Fastener according to claim 4, wherein the longitudinal rib is attached along the stem at a corner of the rectangular cross-section of the stem.

7. Fastener according to claim 1, wherein the stop surface is formed by a stop disc projecting transversely of the stem and disposed at the end thereof remote from the head.

8. Fastener according to claim 1, wherein the elastic feet each comprise a locking ramp, said locking ramps being adapted to cooperate with the stem during passage to the locking position.

9. Fastener according to claim 8, wherein the locking ramps are disposed face to face and laterally offset with respect to each other.

10. Fastener according to claim 1, wherein the stem comprises a circular cross-section proximate to its attachment to the head wherein the passage from the locking position to the unlocking position is reversible.

11. Fastener according to claim 1, wherein the elastic feet each comprise a shoulder adapted to cooperate with the stop surface wherein the passage from waiting position to the locking position is irreversible.

12. Fastener according to claim 1, wherein it is adapted to further assume a molding position in which the first part and the second part are attached by a frangible zone, said stem of the first part being disposed facing the opening of the second part.

13. Fastener according to claim 1, wherein the second part includes two hooked feet projecting from the plate between the elastic feet.

* * * * *